United States Patent [19]

Bauer

[11] 4,059,504

[45] Nov. 22, 1977

[54] HYDROTREATING OF PYROLYSIS GASOLINE

[75] Inventor: William V. Bauer, New York, N.Y.

[73] Assignee: The Lummus Company, Bloomfield, N.J.

[21] Appl. No.: 707,252

[22] Filed: July 21, 1976

[51] Int. Cl.$^2$ ............................................. C10G 23/02
[52] U.S. Cl. ................................ 208/255; 260/677 H
[58] Field of Search ..................... 208/255, 257, 260; 260/677 H

[56] References Cited

U.S. PATENT DOCUMENTS

| | | | |
|---|---|---|---|
| 2,953,519 | 9/1960 | Bercik et al. | 208/255 |
| 3,223,652 | 12/1965 | Erickson et al. | 208/255 |
| 3,696,160 | 10/1972 | Chomyn | 208/255 |

Primary Examiner—George Crasanakis
Attorney, Agent, or Firm—Marn & Jangarathis

[57] ABSTRACT

Pyrolysis gasoline is stabilized by hydrotreating in the presence of a catalyst of cobalt-tungsten sulfide supported on high surface area alumina. Dienes are selectively hydrogenated and mercaptan sulfur is reduced, without production of polymer and the product has an ASTM distillation curve essentially identical to the feed.

8 Claims, No Drawings

HYDROTREATING OF PYROLYSIS GASOLINE

This invention relates to the treatment of a liquid fraction containing dienes and mono-olefins to selectively hydrogenate diolefins, and more particularly, to a new and improved process for hydrotreating a pyrolysis gasoline to selectively hydrogenate diolefins.

The pyrolysis of hydrocarbons for olefin production generates by-product liquids including components in the gasoline boiling range. These liquids have a high aromatic and olefinic content and excellent anti-knock characteristics, and are valuable as gasoline pool components or as a source of aromatics. However, pyrolysis liquids also contain high levels of reactive constituents, such as conjugated diolefins and styrenes, and are therefore very unstable and require hydrotreating before further processing or utilization.

The stabilization of pyrolysis gasoline through hydrotreating has been practiced for many years and various processes are available. Generally, the gasoline is subjected to a first stage hydrotreatment which is conducted at mild conditions (temperatures generally under 400° F) and utilizing selective catalysts; the objective of this stage is to hydrogenate the conjugated diolefins and styrenes with minimal hydrogenation of olefins. This selectivity is desirable to avoid reduction of the octane number of the treated gasoline and to avoid unnecessary hydrogen consumption and exothermic heat effects. The product of first stage treatment is stable, and suitable for addition to the gasoline pool or for further processing. Catalysts used in first stage hydrogenation fall in two classes: (1) noble metal and (2) non-noble metal.

The best known noble metal catalyst for selective hydrotreating of pyrolysis gasoline consist of palladium, with or without modifiers, supported on alumina. Catalysts of this type are generally very active and are used at relatively low temperatures, typically 120° to 200° F inlet with fresh catalyst and 275° to 375° F inlet at the end of the cycle life; the catalyst then requires regeneration to strip off polymers and burn off residual organic contaminants. Hydrotreating can be conducted to achieve good conjugated diolefin and styrene saturation, without excessive olefin hydrogenation (typically 10 to 40%) and without significant aromatics attack (generally under 0.3 to 0.5%).

The second class comprises many non-noble catalysts, the most widely used being Ni, W-Ni, Ni-Mo and Co-Mo. These catalysts generally consist of the metals supported on a high-surface alumina base, and they require either presulfidation or operation with high-sulfur feed, because the sulfides of the metals are the active species. These catalysts are generally less active than the noble metal catalysts, requiring inlet reactor temperatures in the order of 275° to 450° F with fresh catalysts, and lower space velocity — in the order of 1/2 to 3 V/H/V. Thus, cycle life between regenerations is shorter. However, these catalysts are not sensitive to poisoning and can be used successfully to treat pyrolysis liquids with high levels of sulfur or nitrogen.

The non-noble metal catalysts heretofore used in the art have the disadvantage that they tend to produce polymers during the hydrotreating, which has an adverse effect on the final properties of the hydrotreated product; e.g., a tail is produced on the ASTM distillation curve. As a result, there is a need for improvements in the overall process.

In accordance with the present invention, a liquid fraction, containing dienes and mono-olefins; in particular, a pyrolysis gasoline or dripolene (such terms are interchangeably used in the art) is hydrotreated to effect selective hydrogenation of di-olefins by effecting the hydrotreating with a catalyst of cobalt-tungsten sulfide supported on high surface area alumina (surface area of greater than 50 m$^2$/g). It has been found that the use of such a catalyst results in excellent diene reduction and minimal olefin reduction at a practical severity of treatment. In addition, the catalyst is capable of reducing the mercaptan sulfur content of the feed. In addition, there is little, if any, polymer formation, whereby the hydrotreated product has an ASTM boiling curve without a tail and which is essentially identical to the ASTM boiling curve of the feed material.

Pyrolysis gasoline or dripolene is an unstable liquid boiling in the gasoline range which is produced, as a by-product, in hydrocarbon cracking or pyrolysis processes. Pyrolysis gasoline generally boils within the range of from 50° to 400° F and includes olefins (diolefins and mono-olefins), aromatic, constituents together with some sulfur and heavy gum contaminants. The pyrolysis gasoline generally has a total olefin content in the order of 5-40 weight percent (mono-olefin content of 2-20 weight percent; diolefin content of 1-20 weight percent) and an aromatic hydrocarbon content of 30 to 80 weight percent. The feed generally contains from 0.004% to 0.3% of sulfur of which from 0.001% to 0.020% is mercaptan sulfur. The pyrolysis gasoline feed which is stabilized in accordance with the invention is well known in the art and no further details in this respect is deemed necessary for a complete understanding of the invention.

The catalyst employed in the present invention contains from about 0.4% to about 15%, preferably from about 1% to about 5% of cobalt (by weight) and from about 1% to about 20%, preferably 3% to about 10% of tungsten (by weight), with the cobalt to tungsten weight ratio generally being in the order of from about 0.2 to about 1.0, preferably from about 0.25 to about 0.75. The active form of the catalyst is the sulfide form, and the catalyst is preferably presulfided, although when using high sulfur feeds, the active sulfide form is produced on-stream, whereby, in some cases, presulfiding is not required.

The pyrolysis gasoline or dripolene is hydrotreated in the presence of the alumina supported sulfided cobalt-tungsten catalyst to effect stabilization thereof by converting diolefins to mono-olefins and by saturating styrene, while minimizing or eliminating saturation of mono-olefins and aromatics.

The hydrotreating is generally effected by introducing the pyrolysis gasoline and hydrogen into a reactor including a bed of the hereinabove described catalyst. The hydrotreating is effected at an inlet temperature of from about 200° F to 375° F, preferably from about 250° F to 300° F, with the temperature increase through the reactor generally being in the order of from about 15° F to about 100° F, preferably about 30° F to about 80° F. The inlet temperatures are those employed with fresh catalyst and/or regenerated catalyst, and as known in the art, the inlet temperatures may be increased after the catalyst is on-stream for a period of time to compensate for catalyst age. The reactor pressure is generally in the order of 250 to 1,500 psig, preferably from about 300 to about 700 psig, with space velocities being in the order of from about 0.5 to 5 and preferably from 1 to about 3

V/H/V/ Hydrogen is introduced in an amount of from about 150 to about 1,000 scf/barrel of feed, and preferably in the order of from about 200 to about 500 scf/barrel of feed, (generally 10% to 50% excess over the stoichiometric requirement to saturate one double bond of the conjugated diolefins and styrenes in the feed).

The stabilized product produced in accordance with the present invention has a diene content of less than 4, preferably less than from 1 to 2.5. In addition, the mercaptan sulfur is less than 15 ppm, and generally less than 3 ppm. Furthermore, there is little or no polymer formation during the hydrotreating, which provides for longer on-stream times and results in a product having an ASTM distillation curve without a tail and which is essentially identical to the ASTM distillation curve of the feed. Furthermore, the diene reduction can be effected at lower inlet temperatures (based on the beginning of the cycle.)

The stabilized product may be employed, per se, as known in the art, or further hydrotreated in one or more additional stages, as known in the art, to effect saturation thereof for ultimate recovery of an aromatic product.

The invention will be further described with respect to the following examples; however, the scope of the invention is not to be limited thereby.

EXAMPLE

A catalyst of tungsten oxide supported on high surface area alumina (150 m²/g) was impregnated with an aqueous solution of cobalt nitrate, followed by air drying and calcining at 845° F for 3 hours to provide a catalyst containing 2.5 weight % of cobalt and 8 weight % of tungsten.

The catalyst was sulfided and tested for diolefin hydrogenation activity using a synthetic feed of 9.6 weight % isoprene in cyclohexane with additions of thiophene and butanethiol to achieve 450 ppm thiophenic and about 50 ppm mercaptan sulfur dosage. In Examples I and II, the diene value of the feed was 36.6 and in Example III - 40.

| Test Conditions | I | II | III |
| --- | --- | --- | --- |
| Reactor pressure, PSIG | 300 | 485 | 415 |
| AV. catal. temp., ° F | 298° | 310° | 289° |
| Liquid space velocity, V/H/V | 1.8 | 2.3 | 1.76 |
| Product Analyses | | | |
| Diene Value | 1.77 | 1.76 | 2.0 |
| DV reduction ratio, feed/product | 20.6 | 20.7 | 20 |
| Mercaptan sulfur, ppm | — | 13.8 | 3.75 |
| Ratio, feed/product | — | 4 | 13.3 |

| Test Conditions | I | II | III |
| --- | --- | --- | --- |
| Hydrogen Consumption | | | |
| Experimental, SCF/B | 140 | 132 | 179 |
| Theoretical, SCF/B | 138 | 138 | 161 |

In the above Examples, the hydrogen consumption approaches the theoretical value, indicating high diolefin selectivity and minimal olefin attack. In addition, there is considerable mercaptan sulfur reduction.

Numerous modifications and variations of the present invention are possible in light of the above teachings and, therefore, within the scope of the appended claims, the invention may be practiced otherwise than as particularly described.

What is claimed is:

1. In a process for selectively hydrogenating dienes in a liquid feed containing dienes, the improvement comprising:
   effecting said hydrogenating in the presence of a cobalt-tungsten sulfide catalyst supported on high surface area alumina to produce a hydrotreated product without formation of dimers and higher polymers.

2. The process of claim 1 wherein the catalyst contains from 0.4% to 15% of cobalt and from 1% to 20% of tungsten, all by weight, and the cobalt to tungsten weight ratio is from 0.25 to 0.75.

3. The process of claim 2 wherein cobalt is present from 1% to 5%, tungsten is present from 3% to 10%, all by weight, and the cobalt to tungsten weight ratio is from 0.25 to 0.75.

4. The process of claim 1 wherein the liquid feed is a pyrolysis gasoline, said hydrogenating selectively hydrogenating dienes and styrenes present in the pyrolysis gasoline without significant hydrogenating of aromatics and olefins.

5. The process of claim 4 wherein the hydrogenating is effected at a reaction zone inlet temperature of from 200° F to 375° F.

6. The process of claim 5 wherein the catalyst contains from 0.4% to 15% of cobalt and from 1% to 20% of tungsten, all by weight, and the cobalt to tungsten weight ratio is from 0.25 to 0.75.

7. The process of claim 6 wherein cobalt is present from 1% to 5%, tungsten is present from 3% to 10%, all by weight, the cobalt to tungsten weight ratio is from 0.25 to 0.75.

8. The process of claim 7 wherein hydrogen is employed in an amount to provide from 10 to 50% in excess of the stoichiometric requirements for saturating one double bond of the dienes and styrenes in the feed.

* * * * *

Disclaimer 4,059,504.—*William V. Bauer*, New York, N.Y. HYDROTREATING OF PYROLYSIS GASOLINE. Patent dated Nov. 22, 1977. Disclaimer filed May 12, 1980, by the assignee, *The Lummus Company*.

Hereby enters this disclaimer to the remaining term of said patent.

[*Official Gazette July 1, 1980.*]